United States Patent
Lee et al.

(10) Patent No.: US 12,438,814 B2
(45) Date of Patent: Oct. 7, 2025

(54) WIRELESS SIGNAL TRANSMISSION MANAGEMENT METHOD AND SYSTEM

(71) Applicant: MEDIATEK INC., Hsin-Chu (TW)

(72) Inventors: Ching-Hao Lee, Hsinchu (TW); Yi-Lun Chen, Hsinchu (TW); Ho-Wen Pu, Hsinchu (TW); Yu-Yu Hung, Hsinchu (TW); Jun-Yi Li, Hsinchu (TW); Ting-Sheng Lo, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 250 days.

(21) Appl. No.: 18/370,889

(22) Filed: Sep. 21, 2023

(65) Prior Publication Data

US 2024/0106757 A1    Mar. 28, 2024

Related U.S. Application Data

(60) Provisional application No. 63/377,357, filed on Sep. 28, 2022.

(51) Int. Cl.
*G06F 15/16* (2006.01)
*H04L 47/22* (2022.01)
*H04W 28/02* (2009.01)
*H04L 67/131* (2022.01)

(52) U.S. Cl.
CPC ......... *H04L 47/22* (2013.01); *H04W 28/0289* (2013.01); *H04L 67/131* (2022.05)

(58) Field of Classification Search
CPC ... H04L 47/22; H04L 67/131; H04W 28/0289

USPC .......................................................... 709/238
See application file for complete search history.

(56) References Cited

U.S. PATENT DOCUMENTS

| | | | |
|---|---|---|---|
| 6,212,582 B1 * | 4/2001 | Chong | H04L 49/102 |
| | | | 370/444 |
| 9,313,686 B2 * | 4/2016 | Johansson | H04W 72/52 |
| 9,729,458 B2 * | 8/2017 | Moshfeghi | H04L 47/2491 |
| 9,948,563 B2 * | 4/2018 | Nádas | H04L 47/2433 |
| 11,350,309 B2 * | 5/2022 | Lee | H04W 28/0247 |
| 2019/0053260 A1 * | 2/2019 | Shaheen | H04W 72/569 |
| 2019/0090229 A1 * | 3/2019 | Iwai | H04W 28/14 |
| 2021/0204301 A1 * | 7/2021 | Lee | H04W 72/566 |

FOREIGN PATENT DOCUMENTS

| | | | | |
|---|---|---|---|---|
| EP | 0136517 A2 * | 4/1985 | ........ | H04W 74/0816 |
| EP | 0533391 A2 * | 3/1993 | ......... | H04L 12/5601 |
| EP | 0953914 A1 * | 11/1999 | ........... | G06F 13/385 |
| EP | 0955757 A1 * | 11/1999 | ............... | H04L 9/40 |
| EP | 0971541 A2 * | 1/2000 | ........ | H04N 21/2381 |
| EP | 0815688 B1 * | 5/2000 | ........ | H04N 21/4381 |
| EP | 1124356 A2 * | 8/2001 | ............. | H04L 47/22 |
| EP | 1681887 A1 * | 7/2006 | ........ | H04L 47/2433 |

(Continued)

*Primary Examiner* — Moustafa M Meky
(74) *Attorney, Agent, or Firm* — Winston Hsu

(57) ABSTRACT

A method of wireless signal transmission management includes transmitting a plurality of data packets to tethering equipment from user equipment to tethering equipment, determining a size of each of the plurality of data packets by the tethering equipment, designating data packets of the plurality of data packets having a specific range of sizes as control signal packets by the tethering equipment, and prioritizing in transmitting the control signal packets to a cellular network by the tethering equipment.

20 Claims, 4 Drawing Sheets

(56) References Cited

FOREIGN PATENT DOCUMENTS

| | | | | |
|---|---|---|---|---|
| EP | 2442497 | B1 * | 12/2014 | ......... H04L 47/6275 |
| EP | 2949054 | B1 * | 6/2016 | ............ H04W 72/56 |
| EP | 3294014 | A1 * | 3/2018 | ............ H04W 72/52 |
| EP | 3742688 | A1 * | 11/2020 | ............. H04L 47/12 |
| EP | 4024763 | A1 * | 7/2022 | ........... H04L 47/127 |
| EP | 3471456 | B1 * | 11/2023 | ........ H04W 28/0289 |

* cited by examiner

WIRELESS SIGNAL TRANSMISSION MANAGEMENT METHOD AND SYSTEM

CROSS REFERENCE TO RELATED APPLICATIONS

This application claims the benefit of U.S. Provisional Application No. 63/377,357, filed on Sep. 28, 2022. The content of the application is incorporated herein by reference.

BACKGROUND

Extended reality (XR) is an umbrella term that encompasses all the immersive technologies that create and enhance virtual environments. Extended reality includes virtual reality (VR), augmented reality (AR), mixed reality (MR), and other forms of digital simulations that blend the physical and digital worlds. XR can be used for various purposes, such as entertainment, education, training, health care, and social interaction. XR can also provide new ways of accessing information, expressing creativity, and collaborating with others across distances.

Some of the most common XR equipment includes headsets, controllers, tracking cameras, and software. Headsets are the devices that users can wear on their heads to experience XR content. There are two main types of headsets: VR headsets and AR headsets. VR headsets block out the user's view of the real world and immerse the user in a virtual world. AR headsets overlay digital content on top of the real world. Controllers are used to interact with XR content. They can be used to point, click, grab, and manipulate objects in VR and AR. Tracking cameras are used to track the position and orientation of the headset and controllers. This allows the XR content as rendered correctly and to respond to movements.

Signal transmission delay is a common problem in XR service, and it can cause a number of issues, such as lag, motion sickness and loss of immersion. Thus, latency is the key to provide robust XR service to the users. XR equipment needs to transmit control information to remote XR server for processing real-time image and video. These control information includes posture 6DoF information, hand gesture, eye-tracking position, and controller button actions, etc. However, while XR equipment is connected to cellular network with phone or other tethering devices (e.g., MiFi), the user may encounter some undesirable transmission events, such as low SNR (Signal-to-Noise Ratio), crowding or handover. Accordingly, the transmission uplink (UL) control signal packets can be heavily interfered by the transmission of other large size packets (e.g., video packets).

SUMMARY

An embodiment provides a method of wireless signal transmission management including transmitting a plurality of data packets to tethering equipment from user equipment to tethering equipment, determining a size of each of the plurality of data packets by the tethering equipment, designating data packets of the plurality of data packets having a specific range of sizes as control signal packets by the tethering equipment, and prioritizing in transmitting the control signal packets to a cellular network by the tethering equipment.

Another embodiment provides a method of wireless signal transmission management including transmitting a plurality of data packets to tethering equipment from user equipment to tethering equipment, determining a size of each of the plurality of data packets by the tethering equipment, designating data packets of the plurality of data packets having a first range of sizes as first control signal packets by the tethering equipment, designating data packets of the plurality of data packets having a second range of sizes as second control signal packets by the tethering equipment, prioritizing in transmitting the first control signal packets with a first priority to a cellular network by the tethering equipment, and prioritizing in transmitting the second control signal packets with a second priority to the cellular network by the tethering equipment.

Another embodiment provides a wireless signal transmission management system including user equipment and tethering equipment. The user equipment is used to transmit a plurality of data packets. The tethering equipment is used to receive the plurality of data packets from the user equipment, determine a size of each of the plurality of data packets, designate data packets of the plurality of data packets having a first range of sizes as first control signal packets, and prioritize in transmitting the first control signal packets with a first priority to a cellular network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
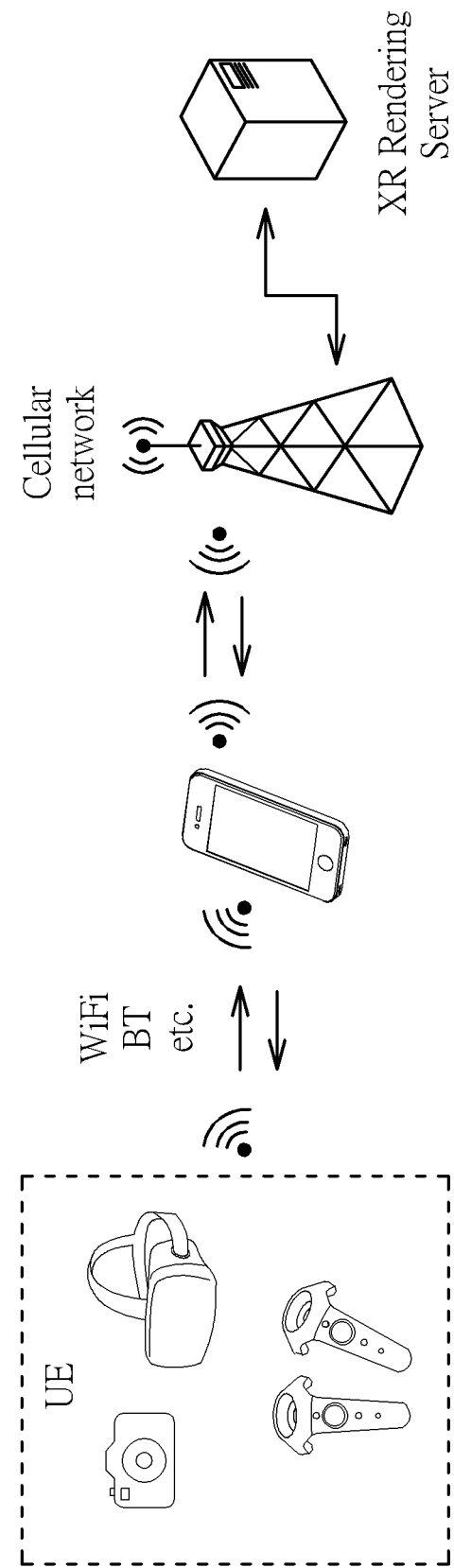
FIG. 1 illustrates a scenario of wireless signal transmission according to the present invention.

FIG. 1 illustrates a scenario of wireless signal transmission according to the present invention. In this scenario, user equipment (UE), or more particularly extended reality (XR) equipment, (e.g., headset, tracking camera, and controller) transmits data packets to tethering equipment through wireless connection such as Wi-Fi, Bluetooth and 5G sidelink. The tethering equipment can then transmit the received data packets through 5G cellular network to an XR rendering server. The XR rendering server can take the 3D models, textures, and other assets that make up an XR experience and renders them into a format that can be displayed on an XR headset or other XR devices.

XR rendering servers are typically used to offload the rendering workload from the XR headset and to enable real-time collaboration on XR experiences. This can help for headsets with limited processing powers and allow multiple users to connect to the same rendering server and collaborate on the same scene. Some of the most popular XR rendering servers include NVIDIA CloudXR™, SMODE, Stardust XR, and InstantXR™.

After XR content are produced, the XR rendering server can transmit the rendered XR contents through the same network back to user equipment. This completes a signal transmission cycle. However, the uplink (UL) latency in this scenario can be high (e.g., more than 400 ms) due to the transmission of video packets interfering with the control signal packet. Comparing to video packets, in 3GPP specification the control signal packets have small fixed packet size. It means the control signal packets tend to have less packet size delay budget (PDB), which is a measure of the amount of time that a packet can take to travel from one point to another in a network. Thus, prioritizing these control signal packets in transmission can significantly decrease latency.

Figure 2:
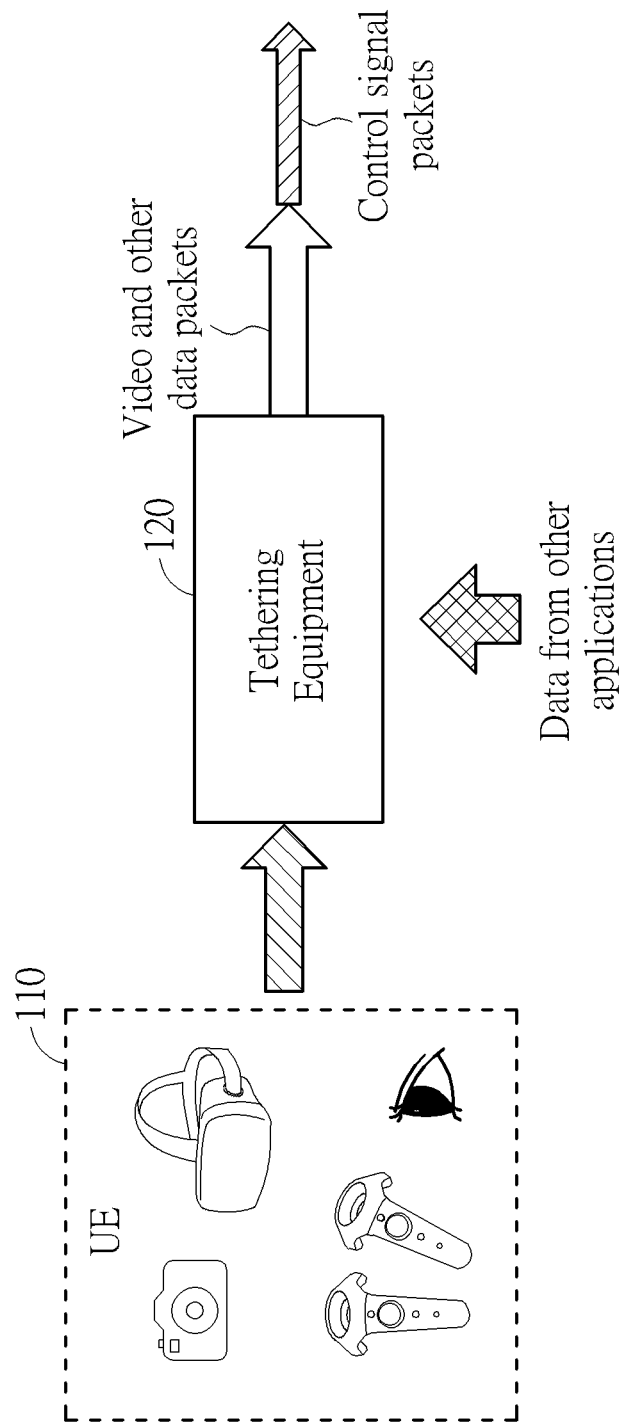
FIG. 2 illustrates a wireless signal transmission management system of an embodiment according to the present invention.

FIG. 2 illustrates a wireless signal transmission management system 100 of an embodiment according to the present invention. The wireless signal transmission management system 100 includes user equipment 110, and tethering equipment 120. The user equipment 110 is used to transmit data packets. These data packets include at least control signal packets and video packets. The tethering equipment 120 is used to receive the data packets from the user equipment 110. Not limited to this, the tethering equipment 120 may also receive data packets from different applications other than the user equipment 110. Further, the tethering equipment 120 is used to determine the size of each data packet, designate data packets having a specific range of sizes as control data packets, and prioritize in transmitting the control signal packets to a cellular network. In some embodiments, the user equipment may 110 be XR equipment such as headsets, tracking cameras, and controllers. The tethering equipment 120 may include Wi-Fi devices, MiFi, cellular devices and customer-premise equipment. The wireless connection between the user equipment 110 and the tethering equipment 120 may include Wi-Fi, Bluetooth, 5G sidelink, and the equivalent thereof. The wireless signal management method is disclosed in detail in the following paragraphs.

Figure 3:
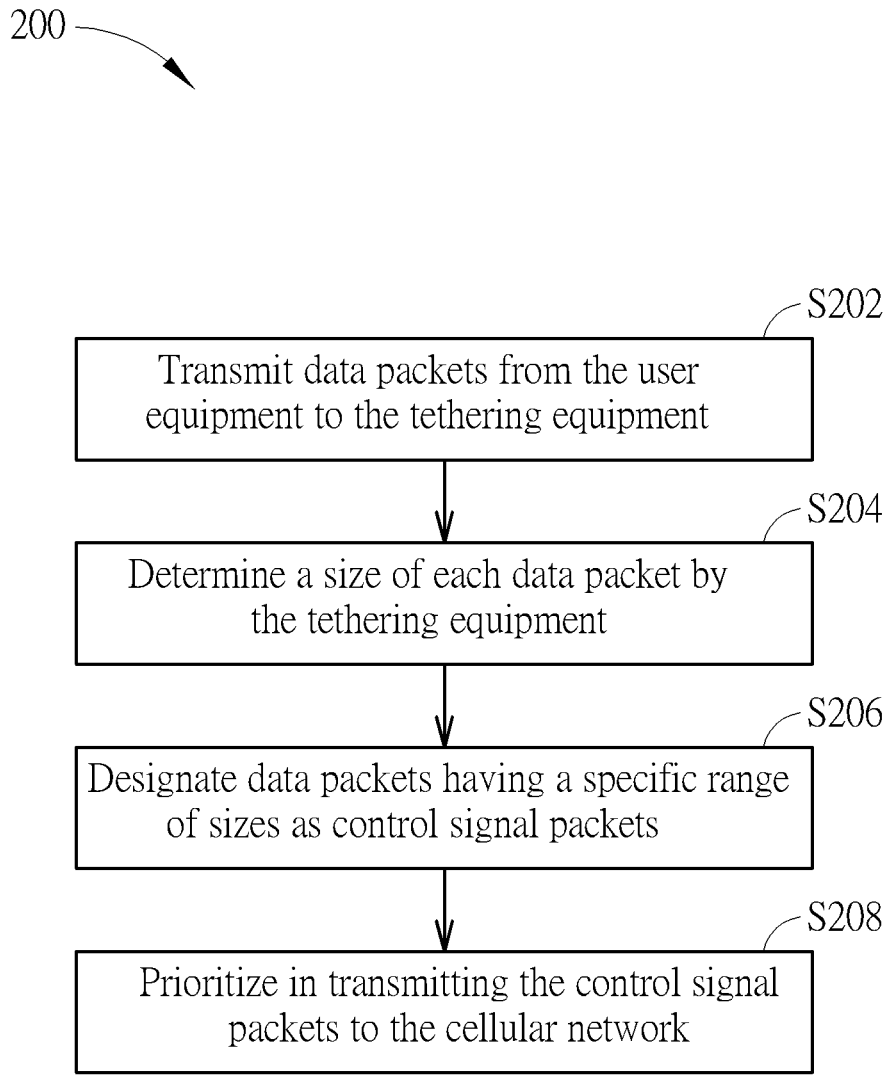
FIG. 3 is a flowchart of a method for wireless signal transmission management of an embodiment according to the present invention.

FIG. 3 is a flowchart of a method 200 for wireless signal transmission management of an embodiment according to the present invention. The method 200 can be implemented by the wireless signal transmission management system 100. The method 200 includes the following steps:

S202: Transmit a plurality of data packets from the user equipment 110 to the tethering equipment 120;

S204: Determine a size of each of the plurality of data packets by the tethering equipment 120;

S206: Designate data packets of the plurality of data packets having a specific range of sizes as control signal packets by the tethering equipment 120; and S208: Prioritize in transmitting the control signal packets to the cellular network by the tethering equipment 120.

In other word, the data packet have the specific range of sizes are determined to be the control signal packets and can be given higher priority over other types of data packet (e.g., video packets). Other types of data packets can be given their regular priority in transmission (e.g., First In First Out) by the tethering equipment 120.

In 3GPP specification TR 38.838 version 17, packet size distribution for video varies, yet the packet size for XR control signals is fixed to 100 bytes. However, the packet size may be modified according to different versions of 3GPP specification. Therefore, the packet size is not limited herein.

In some embodiments, the packet size may vary from 90 bytes to 110 bytes for XR control signals. The control signal packets can be determined based on the packet size as specified by the 3GPP specification. Accordingly, by determining the packet size, most of the control signal packets can be properly selected and prioritized. Thus, by transmitting the smaller control signal packets with higher priority, the XR latency can be significantly reduced.

TABLE 1

|  | Latency (ms) | Latency Increase (ms) | Latency Increase (%) |
| --- | --- | --- | --- |
| Only control signal packets | 43 ms | 0 | 0 |
| Control signal packets and other data packets (without method 200) | 478 ms | 435 ms | 1011% |
| Control signal packets and other data packets (with method 200) | 65 ms | 22 ms | 51% |

Table 1 illustrates comparison of data packet latencies with and without implementing of method 200 for wireless signal transmission management. In this simulated scenario, the latency is mean roundtrip latency. That is, the average time it takes for data packets to travel from the user equipment 110 through the wireless network to a remote rendering server and back to the user equipment 110. If the user equipment 110 only transmits control signal packets, the latency would be 43 ms. In contrast, if the user equipment 110 transmits control signal packets and other data packets without implementing the method 200, the latency would greatly increase to 478 ms. However, if the user equipment 110 transmits control signal packets and other data packets with the implementation of the method 200, the latency would be significantly reduced to 65 ms.

Figure 4:
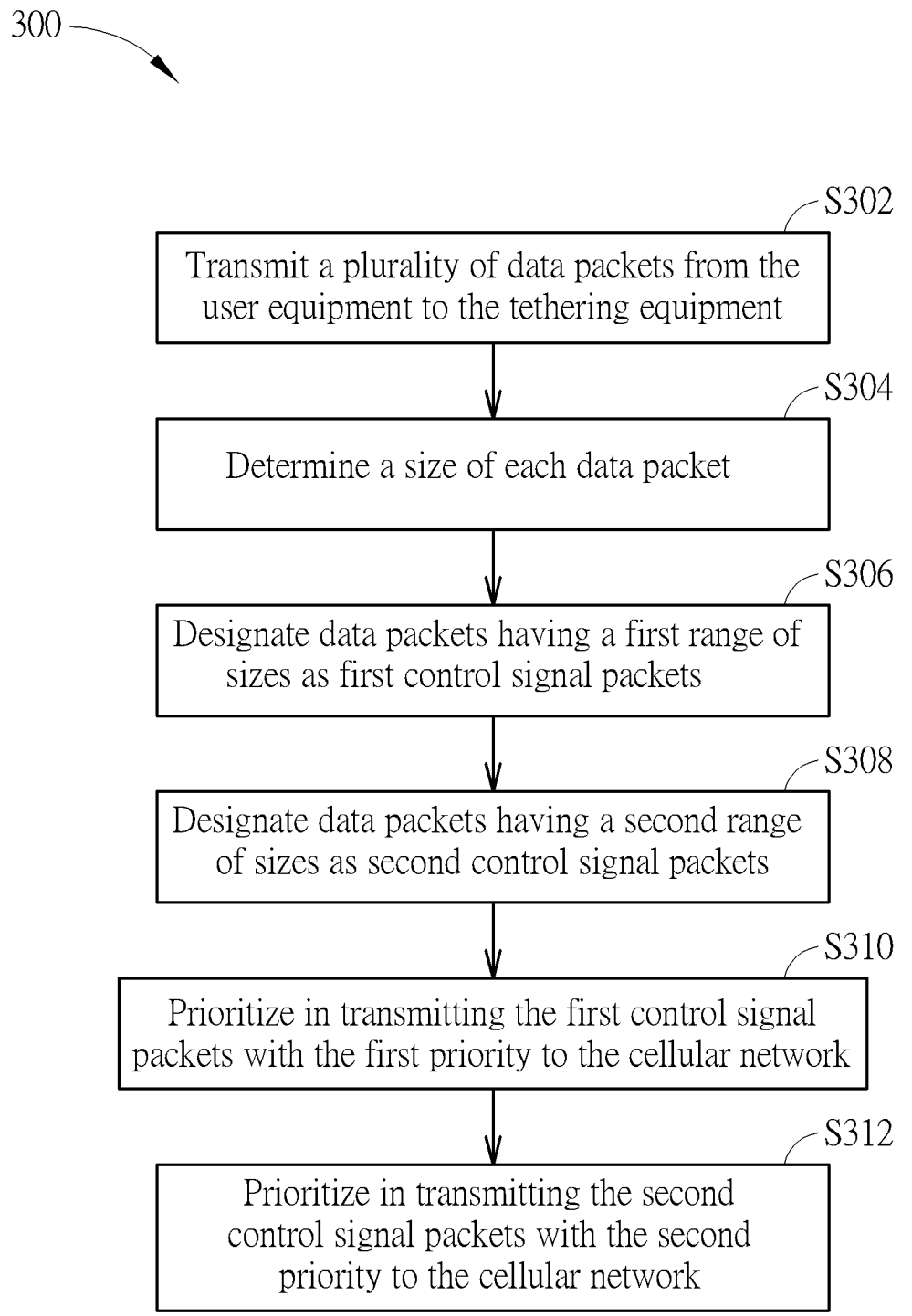
FIG. 4 is a flowchart of a method for wireless signal transmission management of another embodiment according to the present invention.

FIG. 4 is a flowchart of a method 300 for wireless signal transmission management of another embodiment according to the present invention. The method 300 can be implemented by the wireless signal transmission management system 100. The method 300 includes the following steps:

S302: Transmit a plurality of data packets from the user equipment 110 to the tethering equipment 120;

S304: Determine a size of each of the plurality of data packets by the tethering equipment 120;

S306: Designate data packets of the plurality of data packets having a first range of sizes as first control signal packets by the tethering equipment 120;

S308: Designate data packets of the plurality of data packets having a second range of sizes as second control signal packets by the tethering equipment 120;

S310: Prioritize in transmitting the first control signal packets with the first priority to the cellular network by the tethering equipment 120; and S312: Prioritize in transmitting the second control signal packets with the second priority to the cellular network by the tethering equipment 120.

In this embodiment, the control signal packets can be further differentiated by different types. For example, with XR equipment in a gaming scenario, control signal packets from an XR controller may need to be given the highest priority in transmission; the control signal packets from eye tracking sensors may need to be given the second highest priority in transmission; the control signal packets from head-pose sensors may need to be given the third highest priority in transmission, and so on so forth. In Steps 310 and S312, the first priority and the second priority may be the same priority or different priorities.

The control signal packets from different device may have different specified sizes. For example, the tethering equipment 120 can determine the different types of control signal packets and give them different priorities. The control signal packets from the XR controller may have packet sizes ranging from 390 bytes to 410 bytes; the control signal packets from the eye tracking sensor may have packet sizes ranging from 1900 bytes to 2100 bytes; the control signal packets from the head-pose sensors may have packet sizes ranging from 2200 bytes to 2400 bytes. By transmitting the control signal packets requiring the least response time with the highest priority, the user experience for the XR service can be further improved. Regardless of the types, the control signal packets are all relatively small compare to video packets. Thus, by transmitting the smaller control signal packets with higher priority, the XR latency can be significantly reduced.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

The various embodiments described above may be implemented by one or more computers. In further detail, software and hardware hybrid implementations of at some of the embodiments disclosed may be implemented on a programmable network resident device (which should be understood to include intermittently connected network-aware device) selectively activated or reconfigured by a computer program stored in memory. Such network devices may have multiple network interfaces that may be configured or designed to utilize different types of network communication protocols. A general architecture for some of these devices may be disclosed herein in order to illustrate one or more examples by which a given unit of functionality may be implemented. In some embodiments, at least some of the features or functionalities disclosed herein may be implemented on one or more general-purpose computers associated with one or more networks, such as an end-user computer system, a client computer, a network server or other server system, a mobile computing device (e.g., tablet computing device, mobile phone, smartphone, laptop, and the like), a consumer electronic device or any other suitable electronic device, or any combination thereof. In some embodiments, at least some of the features or functionalities of the various embodiments disclosed may be implemented in one or more virtualized computing environments (e.g., network computing clouds, virtual machines hosted on one or more physical computing machines, or the like).

In some embodiments, the computing instructions may be carried out by an operating system, for example, Microsoft Windows™, Apple Mac OS/X or iOS operating systems, some variety of the Linux operating system, Google Android™ operating system, or the like.

In some embodiments, the computers may be on a distributed computing network, such as one having any number of clients and/or servers. Each client may run software for implementing client-side portions of the embodiments. In addition, any number of servers may be provided for handling requests received from one or more clients. Clients and servers may communicate with one another via one or more electronic networks, which may be in various embodiments such as the Internet, a wide area network, a mobile telephone network, a wireless network (e.g., Wi-Fi, 5G, and so forth), or a local area network. Networks may be implemented using any known network protocols.

Reference has been made in detail to implementations, examples of which are illustrated in the accompanying drawings. In the detailed description above, numerous specific details have been set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of wireless signal transmission management comprising:
    transmitting a plurality of data packets from user equipment to tethering equipment;
    determining a size of each of the plurality of data packets by the tethering equipment;
    designating data packets of the plurality of data packets having a specific range of sizes as control signal packets by the tethering equipment; and
    prioritizing in transmitting the control signal packets to a cellular network by the tethering equipment.

2. The method of claim 1, wherein the data packets having a specific range of sizes have a fixed size.

3. The method of claim 2, wherein the fixed size is 100 bytes.

4. The method of claim 1, wherein the specific range of sizes is 90 bytes to 110 bytes.

5. The method of claim 1, wherein the tethering equipment comprises a Bluetooth device, a Wi-Fi device, a cellular device, or customer-premises equipment (CPE).

6. The method of claim 1, wherein the user equipment is extend reality (XR) equipment.

7. A method of wireless signal transmission management comprising:
    transmitting a plurality of data packets from user equipment to tethering equipment;
    determining a size of each of the plurality of data packets by the tethering equipment;
    designating data packets of the plurality of data packets having a first range of sizes as first control signal packets by the tethering equipment;
    designating data packets of the plurality of data packets having a second range of sizes as second control signal packets by the tethering equipment;
    prioritizing in transmitting the first control signal packets with a first priority to a cellular network by the tethering equipment; and
    prioritizing in transmitting the second control signal packets with a second priority to the cellular network by the tethering equipment.

8. The method of claim 7, wherein the data packets having a first range of sizes have a first fixed size, and the data packets having a second range of sizes have a second fixed size.

9. The method of claim 7, wherein the first priority is higher than the second priority.

10. The method of claim 7, wherein the tethering equipment comprises a Bluetooth device, a Wi-Fi device, a cellular device, or customer-premises equipment (CPE).

11. The method of claim 7, wherein the user equipment is extend reality (XR) equipment.

12. A wireless signal transmission management system comprising:
    user equipment configured to transmit a plurality of data packets;
    tethering equipment configured to:
        receive the plurality of data packets from the user equipment;
        determine a size of each of the plurality of data packets;
        designate data packets of the plurality of data packets having a first range of sizes as first control signal packets; and
        prioritize in transmitting the first control signal packets with a first priority to a cellular network.

13. The signal management system of claim 12, wherein the data packets having a specific range of sizes have a fixed size.

14. The signal management system of claim 13, wherein the fixed size is 100 bytes.

15. The signal management system of claim 12, wherein the specific range of sizes is 90 bytes to 110 bytes.

16. The signal management system of claim 12, wherein the tethering equipment comprises a Bluetooth device, a Wi-Fi device, a 5G cellular device, or customer-premises equipment (CPE).

17. The signal management system of claim 12, wherein the user equipment is extend reality (XR) equipment.

18. The signal management system of claim 12, wherein the tethering equipment is further configured to:
    designate data packets of the plurality of data packets having a second range of sizes as second control signal packets by the tethering equipment; and
    prioritize in transmitting the second control signal packets with a second priority to the cellular network by the tethering equipment.

19. The method of claim 18, wherein the data packets having a first range of sizes have a first fixed size, and the data packets having a second range of sizes have a second fixed size.

20. The method of claim 18, wherein the first priority is higher than the second priority.

* * * * *